United States Patent
Fliess et al.

(10) Patent No.: US 7,519,539 B1
(45) Date of Patent: Apr. 14, 2009

(54) ASSISTED PROFILING OF SKILLS IN AN ENTERPRISE MANAGEMENT SYSTEM

(75) Inventors: Kevin V. Fliess, Mountain View, CA (US); Dennis B. Moore, Burlingame, CA (US); Irene Ivashenko, Los Altos, CA (US)

(73) Assignee: Sap Aktiengesellschaft (DE)

( * ) Notice: Subject to any disclaimer, the term of this patent is extended or adjusted under 35 U.S.C. 154(b) by 1610 days.

(21) Appl. No.: 10/210,765

(22) Filed: Jul. 31, 2002

(51) Int. Cl.
*G06Q 99/00* (2006.01)
(52) U.S. Cl. ......................................................... 705/1
(58) Field of Classification Search ................... 705/1
See application file for complete search history.

(56) References Cited

U.S. PATENT DOCUMENTS

| 2003/0126141 A1* | 7/2003 | Hassman et al. ............ 707/100 |
| 2003/0229529 A1* | 12/2003 | Mui et al. ...................... 705/8 |

* cited by examiner

*Primary Examiner*—Jonathan Ouellette
(74) *Attorney, Agent, or Firm*—Fish & Richardson P.C.

(57) ABSTRACT

Systems and techniques to maintain current skills profile information in an enterprise management system. By partially tying maintenance of skills profiles into project management, the skills profile information used by an enterprise can be kept more current and more accurate. Status information relating to a project in a project management system can be received. In response to receiving this status information, an assisted profiling interface can be presented to obtain updates to a skills profile. The assisted profiling interface can provide suggested updates based on the skills profile and a role associated with the project.

20 Claims, 20 Drawing Sheets

Project Details — 900

| | |
|---|---|
| Project Name | Plavix |
| Project Description | It keeps blood platelets from sticking together and forming clots, which helps keep blood flowing. It's specifically designed for people who have had a recent heart attack, a recent stroke, or have poor circulation in the legs, which may cause pain (known as peripheral arterial disease or PAD). |
| Therapeutic Area | Cardiovascular |
| Project Manager | Dan Allen |
| Location | Billerica, MA |

📄 Project Scope
📄 Business Objectives

| | Planned | Actual |
|---|---|---|
| Budget | $7,000,900.00 | $5,630,000.00 |
| Project Start | 10/20/1998 | 10/20/1998 |
| Project End | 09/30/2002 | 09/30/2002 |
| ECV | $200,000,000.00 | $250,000,000.00 |
| Risk % | 7 | 7 |
| Headcount | 5 | 5 |

Attachments

[Add Files]
[Submit]

PharmaCo

Welcome, John Adams
Personalize: Page | Portal

Home | Integrated Program Management
Project Portfolio Management • Key Performance Indicators

Project Dashboard — 1600

| Therapeutic Areas | Projects | Budget | Schedule | ECV | Risk | Staffing | Phase — 1615 |
|---|---|---|---|---|---|---|---|
| ▷ Anti-Infectious | 1 | ■ | ■ | ● | ■ | ● | |
| ▷ Cardiovascular | 3 | ● | ● | ● | ◁ | ● | |
| ▷ Diabetes | 2 | ● | ● | ■ | ■ | ■ | |
| ▷ Gynecology | 1 | ● | ■ | ● | ● | ● | |
| ▷ Mental Health | 1 | ■ | ■ | ■ | ■ | ● | |
| ▷ Migraine | 1 | ■ | ◁ | ■ | ● | ● | |
| ▽ Neuroscience | 2 | ■ | ◁ | ■ | ● | ● | |
|   ▷ Lodosyn | | ● | ● | ■ | ● | ● | Preclinical Dev. |
|   ▷ Sinemet | | | | | | | Discovery |
| ▷ Oncology | 3 | ● | ● | ● | ● | ■ | |

New Proposal

Alerts & Notifications — 1650

| | | Date & Time | Description |
|---|---|---|---|
| ☐ | | 1/17/2002 - 9:30am | Project "Taxol" has been proposed in the Therapeutic Area "Oncology". Immediate attention is required. |
| ☐ | | 1/18/2002 - 3:45pm. | Spending in the Therapeutic Area "Neuroscience" exceeds allocated budget. Review budget allocations. |

[New] [Delete]

Project Review

For each question that follows, answer using the following scale regarding the project

| | 1<br>Unacceptable | 2<br>Poor | 3<br>Fair | 4<br>Good | 5<br>Excellent |
|---|---|---|---|---|---|
| Rate your performance in each category on this project | | | | | |
| Reliability | ☆ | ☆ ☆ | ☆☆☆ | ☆☆☆☆ | ☆☆☆☆☆ |
| Creativity | ☆ | ☆ ☆ | ☆☆☆ | ☆☆☆☆ | ☆☆☆☆☆ |
| Quality | ☆ | ☆ ☆ | ☆☆☆ | ☆☆☆☆ | ☆☆☆☆☆ |
| Teamwork | ☆ | ☆ ☆ | ☆☆☆ | ☆☆☆☆ | ☆☆☆☆☆ |
| Rate Pat Lee (your direct manager) for each category of performance on this project | | | | | |
| Leadership | ☆ | ☆ ☆ | ☆☆☆ | ☆☆☆☆ | ☆☆☆☆☆ |
| Management | ☆ | ☆ ☆ | ☆☆☆ | ☆☆☆☆ | ☆☆☆☆☆ |
| Mentoring | ☆ | ☆ ☆ | ☆☆☆ | ☆☆☆☆ | ☆☆☆☆☆ |
| Knowledge | ☆ | ☆ ☆ | ☆☆☆ | ☆☆☆☆ | ☆☆☆☆☆ |
| Effective scheduling | ☆ | ☆ ☆ | ☆☆☆ | ☆☆☆☆ | ☆☆☆☆☆ |
| Setting expectations | ☆ | ☆ ☆ | ☆☆☆ | ☆☆☆☆ | ☆☆☆☆☆ |
| Rate the project for its results in each category | | | | | |
| Customer value | ☆ | ☆ ☆ | ☆☆☆ | ☆☆☆☆ | ☆☆☆☆☆ |
| Quality | ☆ | ☆ ☆ | ☆☆☆ | ☆☆☆☆ | ☆☆☆☆☆ |
| Contribution to your skills and expertise | ☆ | ☆ ☆ | ☆☆☆ | ☆☆☆☆ | ☆☆☆☆☆ |

For each question that follows, answer using the following scale

| 1<br>Definitely not | 2<br>Prefer not to | 3<br>Neutral about possibility | 4<br>Prefer to | 5<br>Would like to very much |
|---|---|---|---|---|

Would you like to work with Pat Lee again?

☆     ☆ ☆     ☆☆☆     ☆☆☆☆     ☆☆☆☆☆

Would you like to work with your project co-workers again?

☆     ☆ ☆     ☆☆☆     ☆☆☆☆     ☆☆☆☆☆

Please add any additional comments here

[ text box ]

Thank you for taking the time to review the project. Click the "submit" button below to complete the survey

[Submit]

FIG. 20

ASSISTED PROFILING OF SKILLS IN AN ENTERPRISE MANAGEMENT SYSTEM

BACKGROUND

The present application describes systems and techniques relating to enterprise management systems.

Various systems and techniques exist for managing enterprise data. Such systems and techniques include management systems that maintain skills information for users of the system (e.g., employees, managers, associates, partners). In the field of enterprise management, effectively maintaining skills information can be very useful in understanding the current human capital available to an enterprise.

SUMMARY

The present application discloses systems and techniques for maintaining current skills profile information. By partially tying maintenance of skills profiles into project management, the skills profile information used by an enterprise can be kept more current and more accurate. Project management generally includes systems and techniques for tracking of tasks in a project to help ensure that various stages of a project are completed on time. According to an aspect, status information relating to a project in a project management system can be received. In response to receiving this status information, an assisted profiling interface can be presented to obtain updates to a skills profile. The assisted profiling interface can provide suggested updates based on the skills profile and a role associated with the project.

According to another aspect, information indicating a status of completion for a task in a project in a project management system can be received. In response to receipt of this information, a graphical user interface can be presented to obtain updates to a skills profile. The graphical user interface can list task skills associated with the task, current skill proficiency levels for the task skills for a user associated with the skills profile, and suggested new proficiency levels for the task skills. The suggested new proficiency levels can be derived from the task and the current skill proficiency levels, and the graphical user interface can include user interface elements associated with the suggested new proficiency levels to receive alternative new proficiency levels.

BRIEF DESCRIPTION OF THE DRAWINGS

FIG. 7 shows an example view created by an integrated program management system.

FIG. 9 shows an example view that is displayed when a project is selected, such as by clicking on a graphic object in an expected commercial value chart.

FIG. 10 shows an example view that is displayed when a proposed project is selected.

FIG. 14 shows another example view created by an integrated program management system.

FIG. 16 shows another example view created by an integrated program management system.

FIG. 17 shows an example view that has been personalized through a portal for a user with an employee role.

FIG. 18 shows an example employee projects view.

FIG. 19 shows an example assisted profiling view.

FIG. 20 shows an example project review questionnaire.

Like reference symbols in the various drawings indicate like elements.

DETAILED DESCRIPTION

Figure 1:
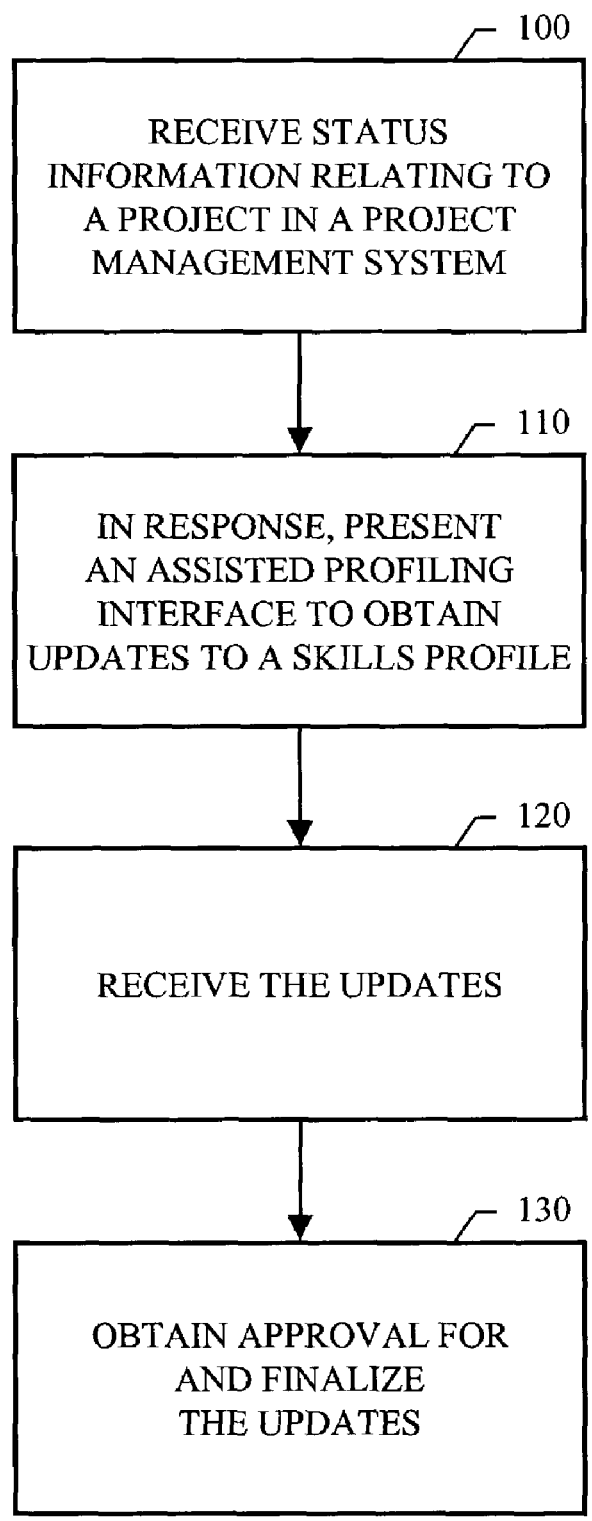
FIG. 1 is a flow chart illustrating a process of maintaining current skills profile information.

FIG. 1 is a flow chart illustrating a process of maintaining current skills profile information. Status information relating to a project in a project management system is received at 100. This status information can include an indication of a completed status, such as for the project or for a task included in the project. In response to receipt of the status information, an assisted profiling interface is presented to obtain updates to a skills profile at 110. The assisted profiling interface can include suggested updates based on the skills profile and a role associated with the project.

For example, the status information can provide an indication of a completed status for a task included in the project, where the role is associated with the task. The assisted profiling interface can be a graphical user interface that displays the suggested updates based on the skills profile associated with a user associated with the role. Task skills associated with the task, corresponding current skill proficiency levels from the skills profile, and suggested new proficiency levels for the task skills can be displayed. The suggested new proficiency levels can be derived from the task and the current skill proficiency levels, such as by suggesting an incremental increase in skill level (e.g., basic to proficient) in light of the completed task and the associated task skills that are required for the role.

The updates can be received at 120. Then, approval for the updates can be obtained at 130. Obtaining approval can involve providing a manager interface to a direct manager for the user making the change to her profile. This manager interface can include an option to respond with feedback. The manager can accept, reject or discuss the requested changes to the skills profile using the manager interface. Thus, finalizing the updates to the skills profile can be made dependent on approval by a manager.

Moreover, receiving the status information can involve receiving an indication of a completed status for the project. For example, a manager can specify that the project has been completed, even if current tasks remain. In this event, personalized assisted profiling interfaces, such as described above and also below, can be presented to all the users assigned to the completed project. Thus, updates to skills profiles for multiple users associated with the project can be readily obtained upon completion of a project.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Figure 2:
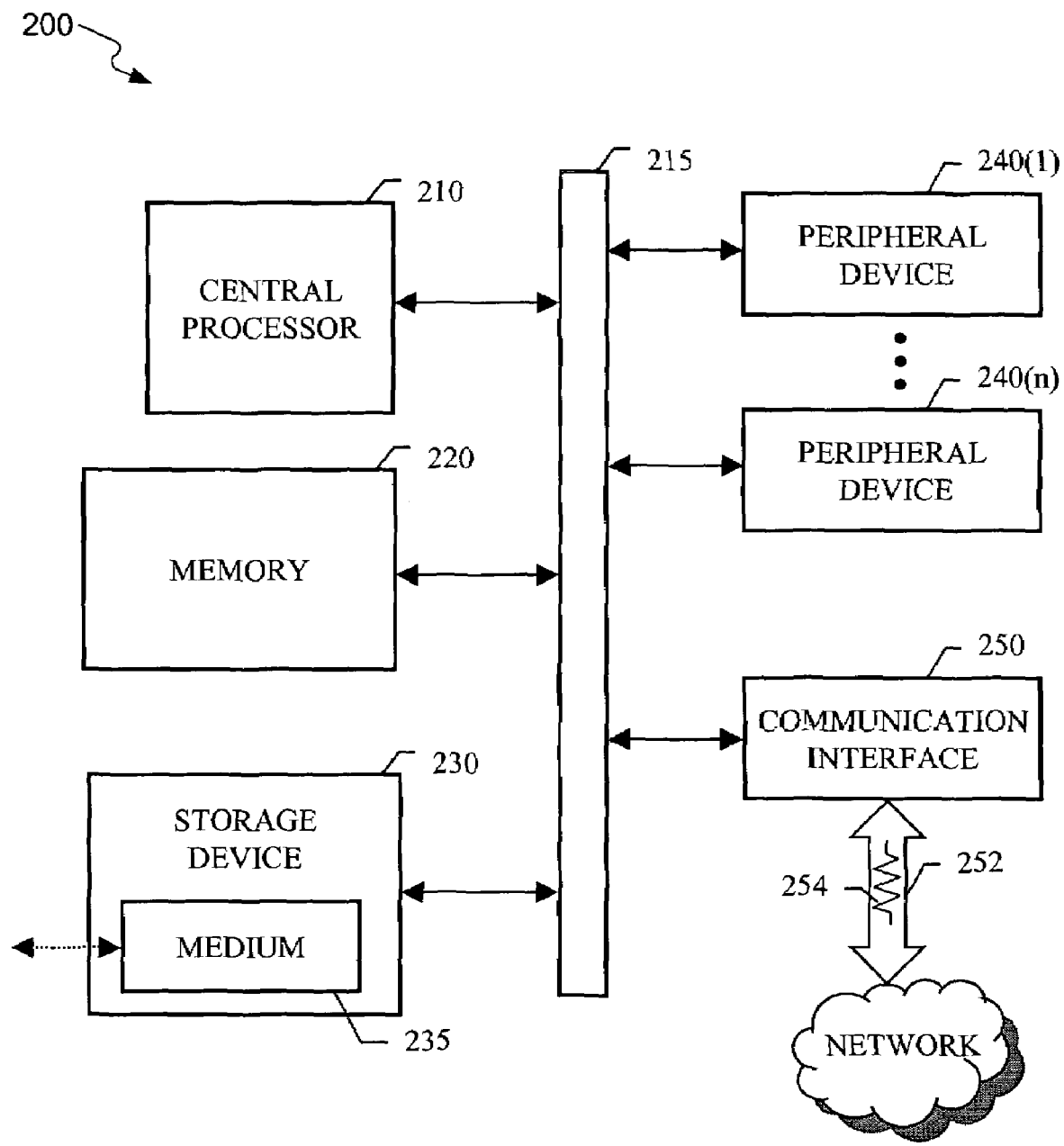
FIG. 2 is a block diagram illustrating an example data processing system.

FIG. 2 is a block diagram illustrating an example data processing system 200. The data processing system 200 includes a central processor 210, which executes programs, performs data manipulations and controls tasks in the system 200. The central processor 210 is coupled with a bus 215 that can include multiple busses, which may be parallel and/or serial busses.

The data processing system 200 includes a memory 220, which can be volatile and/or non-volatile memory, and is coupled with the communications bus 215. The system 200 can also include one or more cache memories. The data processing system 200 can include a storage device 230 for accessing a medium 235, which may be removable, read-only or read/write media and may be magnetic-based, optical-based, semiconductor-based media, or a combination of these. The data processing system 200 can also include one or more peripheral devices 240(1)-240(n) (collectively, devices 240), and one or more controllers and/or adapters for providing interface functions.

The system 200 can further include a communication interface 250, which allows software and data to be transferred, in the form of signals 254 over a channel 252, between the system 200 and external devices, networks or information sources. The signals 254 can embody instructions for causing the system 200 to perform operations. The system 200 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 200 and/or delivered to the machine 200 over a communication interface. These instructions, when executed, enable the machine 200 to perform the features and function described above. These instructions represent controllers of the machine 200 and can be implemented in a high-level procedural and/or object-oriented programming language, and/or in assembly/machine language. Such languages can be compiled and/or interpreted languages.

As used herein, the term "machine-readable medium" refers to any computer program product, apparatus and/or device used to provide machine instructions and/or data to the machine 200, including a machine-readable medium that receives machine instructions as a machine-readable signal. Examples of a machine-readable medium include the medium 235, the memory 220, and/or PLDS, FPGAs, ASICs, and the like. The term "machine-readable signal" refers to any signal, such as the signals 254, used to provide machine instructions and/or data to the machine 200.

Figure 3:
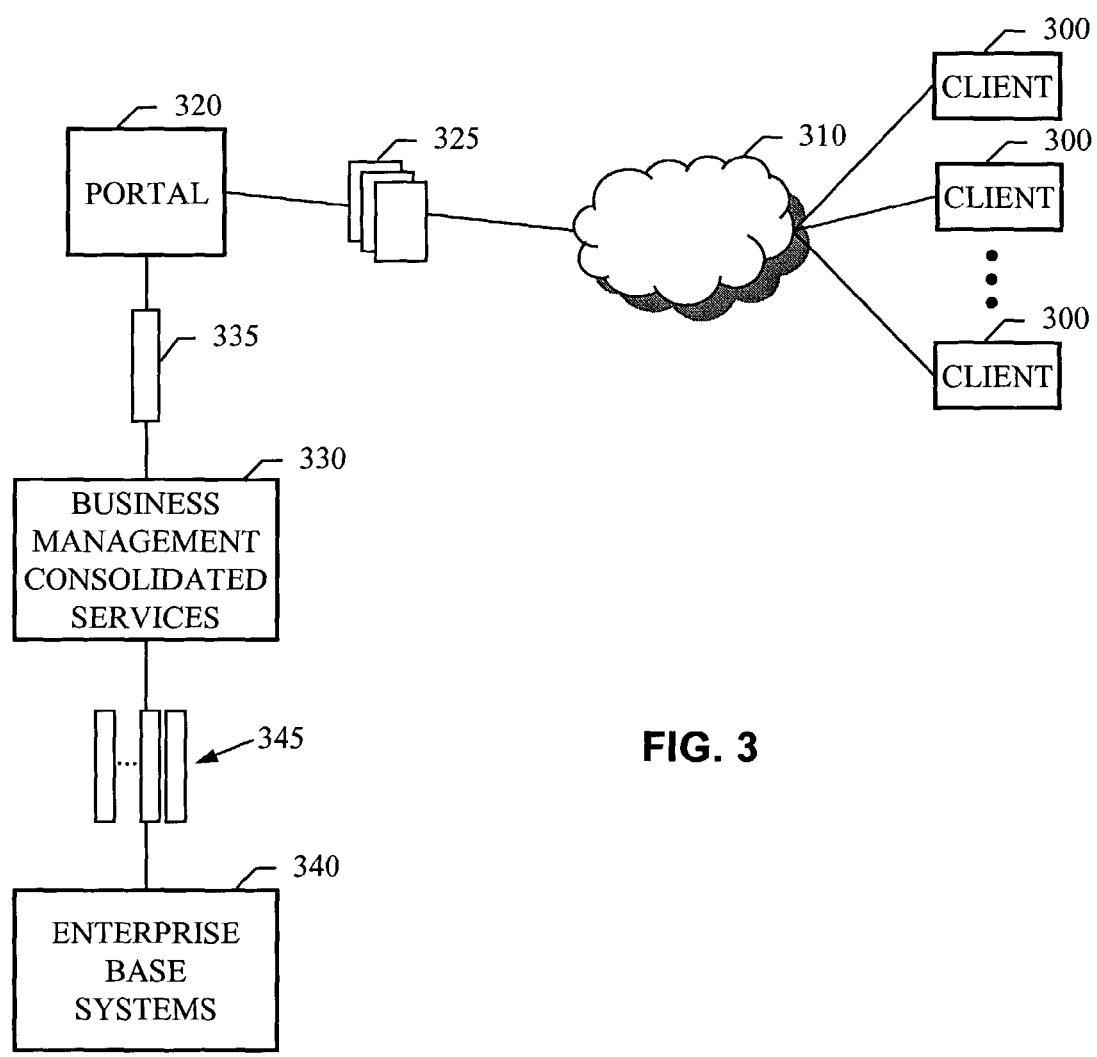
FIG. 3 is a block diagram illustrating an example integrated business management system.

FIG. 3 is a block diagram illustrating an example integrated business management system. Multiple clients 300 can access data over a network 310 through a portal 320. The network 310 can be any communication network linking machines capable of communicating using one or more networking protocols. The network 310 can be a local area network (LAN), metropolitan area network (MAN), wide area network (WAN), enterprise network, virtual private network (VPN), the Internet, etc. The clients 300 can be any machines or processes capable of communicating over the network 310. The clients 300 can be Web Browsers and can be communicatively coupled with the network 310 through a proxy server.

The portal 320 provides a common interface to program management services. The portal 320 receives requests from the clients 300 and generates data views 325 (e.g., Web pages) in response. The portal 320 can implement a user roles based system to personalize the common interface and the data views 325 for a user of a client 300. A user has one or more associated roles that allow personalized tailoring of a presented interface through the generated data views 325.

The portal 320 communicates with a business management system 330 that consolidates multiple application services. The portal 320 receives data 335 from the business management system 330 for use in fulfilling the requests from the clients 300. The business management system 330 provides integrated application services to manage business objects in a business enterprise. The business objects can be resources (e.g., human resources), development projects, business programs, inventories, clients, accounts, business products, and/or business services.

The business management system 330 communicates with enterprise base systems 340 to obtain multiple types of data 345. The enterprise base systems 340 can include various existing application services, such as human resource management systems, financial management systems, project management systems, time management systems, and electronic file and/or mail systems. The business management system 330 can consolidate and integrate the data and functionality of such systems into a single business management tool.

The portal 320, business management system 330 and enterprise base systems 340 can reside in one or more programmable machines, which can communicate over a network or one or more communication busses. For example, the base systems 340 can reside in multiple servers connected to an enterprise network, and the portal 320 and the business management system 330 can reside in a server connected to a public network. Thus, a user of the system can access and manage business programs and resources through a single portal from anywhere that access to a public network is available.

Figure 4:
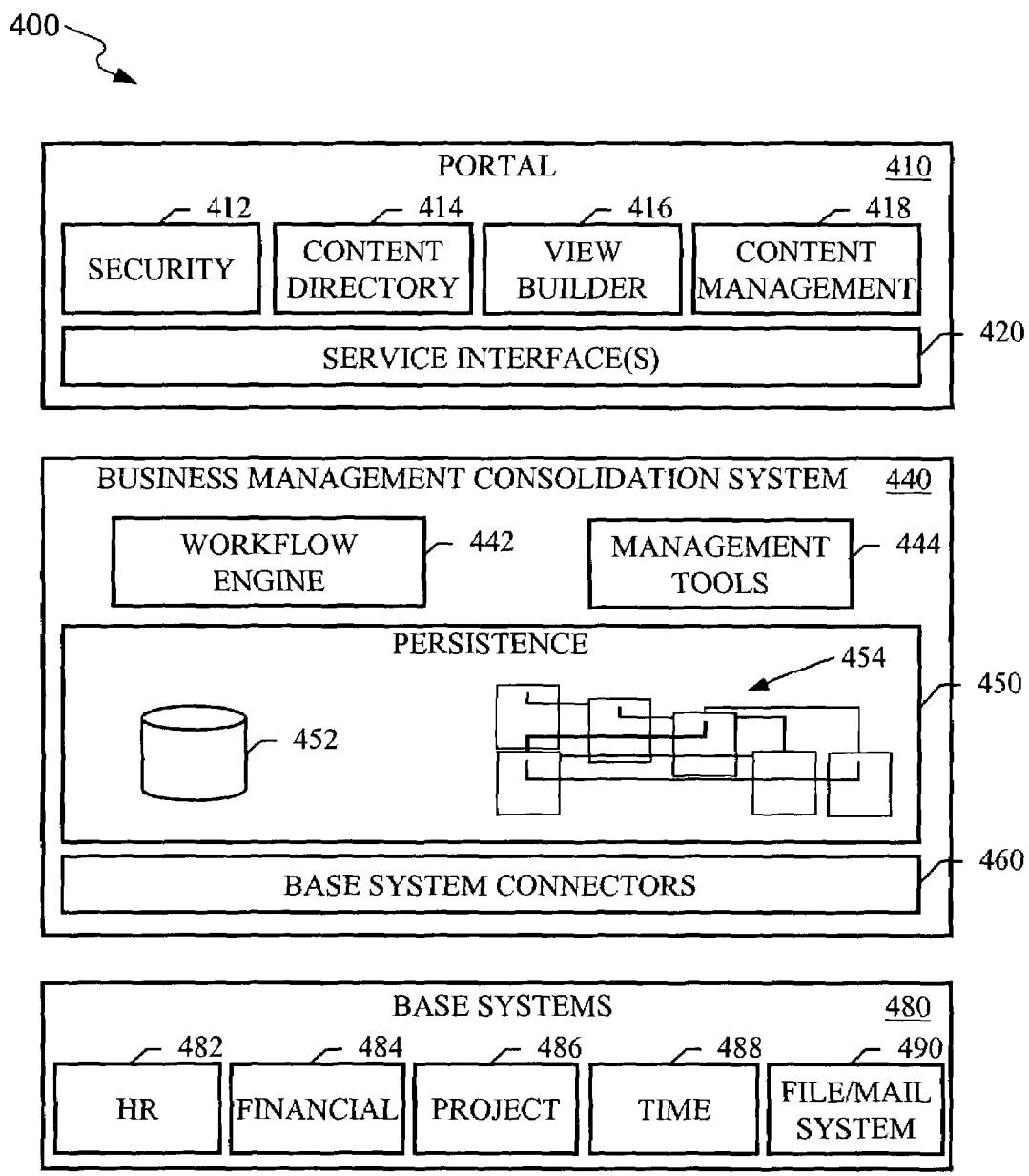
FIG. 4 is a block diagram illustrating components of an example integrated business management system.

FIG. 4 is a block diagram illustrating components of an example integrated business management system 400. The system 400 includes a portal 410, a business management consolidation system 440, and base systems 480. The base systems 480 include a human resources (HR) system 482, a financial management system 484, a project management system 486, a time management system 488, and a file/mail system 490. The HR system 482 can store and track employee master data and organizational data, employee availability data, and employee skills data. The financial management system 484 can store and track project costs using project master data, accounts data and budget data.

The financial management system 484 can be integrated with the project management system 486, which can store and track project master data, organizational data, scheduling, location and quality, and required skills data. The time management system 488 can store and track time worked data on an employee and project basis. The mail/file system 490 can be a networked electronic mail system and electronic file system.

The business management consolidation system 440 includes a workflow engine 442 and management tools 444, and can also include a BSP (Business Server Page(s)) runtime module to interface with a view builder 416 in the portal 410. The management system 440 also includes a persistence layer 450 and one or more base system connectors 460. The base system connectors 460 enable data exchange and integration with the base systems 480. The base system connectors 460 can include a BC (Business Connector) interface, an ICM/ICF (Internet Communication Manager/Internet Communication Framework) interface, an Encapsulated PostScript® (EPS) interface, or other interfaces that provide FRC (Remote Function Call) capability.

The persistence layer 450 provides the business management consolidation system 440 with its own database 452 and data object model 454. The database 452 and the object model 454 provide a consolidated knowledge base to support multiple business management functions, such as portfolio management, project execution, risk assessment, budgeting, scheduling, workforce planning (e.g., staffing resource assignment and hiring), skills management, business forecasting, and capacity modeling. Active communication between the persistence layer 450 and the base systems 480 provides a tight linkage between real-time operational data from multiple base systems and an integrated business analysis tool to allow strategic business management and planning.

The data object model 454 can represent a subset of data objects managed by the base systems 480. Not all of data aspects tracked in the base systems 480 need to be recorded in the data object model 454. The data object model 454 may have defined relationships with data objects stored in the base systems 480, for example, certain objects in the data object model 454 may have read only or read-write relationships with corresponding data objects in the base systems 480. These types of defined relationships can be enforced through the communication system built between the persistence layer 450 and the base systems 480. Thus, the persistence layer 450 can be used to effectively decouple application development built on top of the business management consolidation system 400 from the underlying base systems 480.

The workflow engine 442 coordinates the activities of the management tools 444 and their interactions with the portal 410. The workflow engine 442 can enforce the routine exercise of required business practices. The management tools 444 can include a project administration tool, a search and assignment engine, a portfolio/reporting data extractor, and a profile manager. The management tools 444 enable various types of worker profiling, maintenance and discovery of available skills information, and a unified view of skills, performance, and assessment information to improve work assignment decisions. Progress of projects across multiple project management systems and time tracking systems can be monitored through the unified management tools 444, and the management tools 444 can include functions for personalized, event-driven alerts to enable exception-based and time-critical action.

The portal 410 provides an entry point for, and an interface to, the services provided by the business management consolidation system 440. The portal 410 can be a Web portal and can be accessible through a public network. The portal 410 can provide a role based user interface where users log in and have defined roles. A user's role determines the type of access provided and the format of the views presented. The portal 410 can be configurable at an individual level, such that the resulting user interface presents only those functions for which the user has access.

The portal 410 includes a security component 412, a content directory component 414, a view builder 416, a content management component 418, and one or more service interfaces 420 to the business management consolidation system 440. The service interfaces 420 can include an ITS (Internet Transaction Server) component, various connectors, such as a Java Connector (e.g., a Jco connector), and a BI (Business Intelligence) platform. The content management component 418 can include a retrieval and classification component (e.g., Text Retrieval and Extraction component (TREX)) and a collaboration component.

The retrieval and classification component can automatically scan unstructured documents to identify know-how. The view builder 416 can create role based interactive views (e.g., Web pages) for presentation to users. The security component 412 can protect data transmissions using encryption (e.g., Secure Sockets Layer (SSL)), digital signatures, and/or watermarking.

The systems and techniques described above can be implemented to provide graphical representations of projects in which several different parameters can be intuitively understood, compared and used in making project funding decisions. The following describes a project focused implementation of an integrated business management system in an example industry using example roles. Other implementations are also possible.

Figure 5:
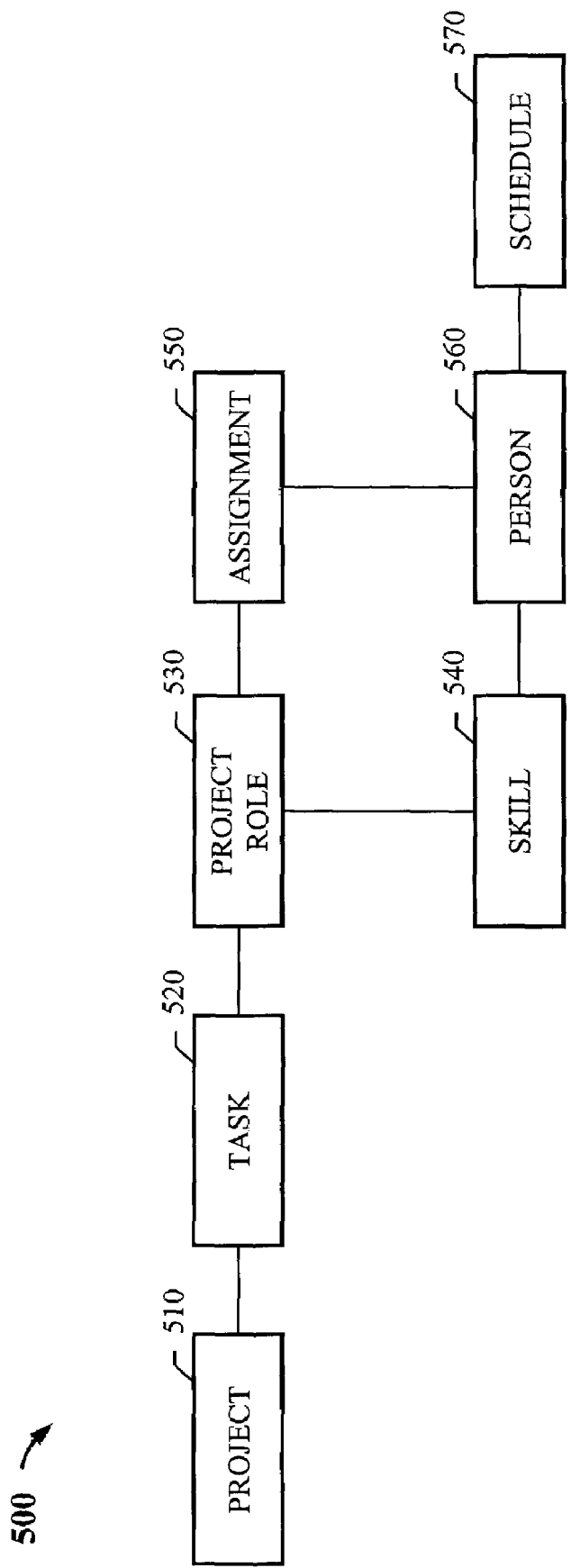
FIG. 5 shows an example object model for use in a project focused implementation.

In an implementation focused on project management, the persistence layer 450 can include components to maintain and coordinate data relating to qualifications and skills, workers (e.g., employees and/or partners), assignments of individuals into projects, project structures, and availability. FIG. 5 shows an example object model 500 for use in a project focused implementation. The object model 500 includes various types of business objects, such as project 510, task 520, project role 530, skill 540, assignment 550, person 560, and schedule 570.

Roles provide pre-defined access rights to common business processes. Example roles include portfolio manager, project proposer, project approver, project manager, Work Breakdown Structure (WBS) manager, project assessment creator, candidate seeker, resource manager, profile approver, project seeker, project team member, and resource. A user may belong to more than one role, and the user's roles can be set up by a system administrator. The system administrators also can create new roles, which may be composites of other roles, as well as modify existing roles to conform to enterprise-specific business processes. Thus, the rendering of functionality through a role is configurable.

A project focused implementation can be used to plan, define, deploy, execute and complete business projects. The integrated business management system can be used to aggregate project demand across multiple base systems, provide snapshots of project performance across all program categories, analyze project portfolio data to assess and modify budgeting and to determine which projects to start and stop. Projects can be defined by uploading WBS elements directly from base systems and extending these WBS elements by assigning roles and tasks.

Managers can use the system to find the right people for a project based on current skills and qualifications data, and employees can use the system to find the right project, potentially leading to increased productivity, employee motivation and higher retention levels. Projects can be monitored using diagnostic tools with efficiently presented graphical representations, such as described below, enabling early identification of risks, and making mid-course adjustments easier. Team members can collaborate and communicate within the context of a project workspace, can easily report progress on tasks across multiple projects, potentially leading to more accurate reporting, better data quality, and better decision making for projects. When projects are finished, individual and team performance can be measured through structured, yet flexible project assessments, and updates to employee skill profiles can be automatically collected and verified.

Figure 6:
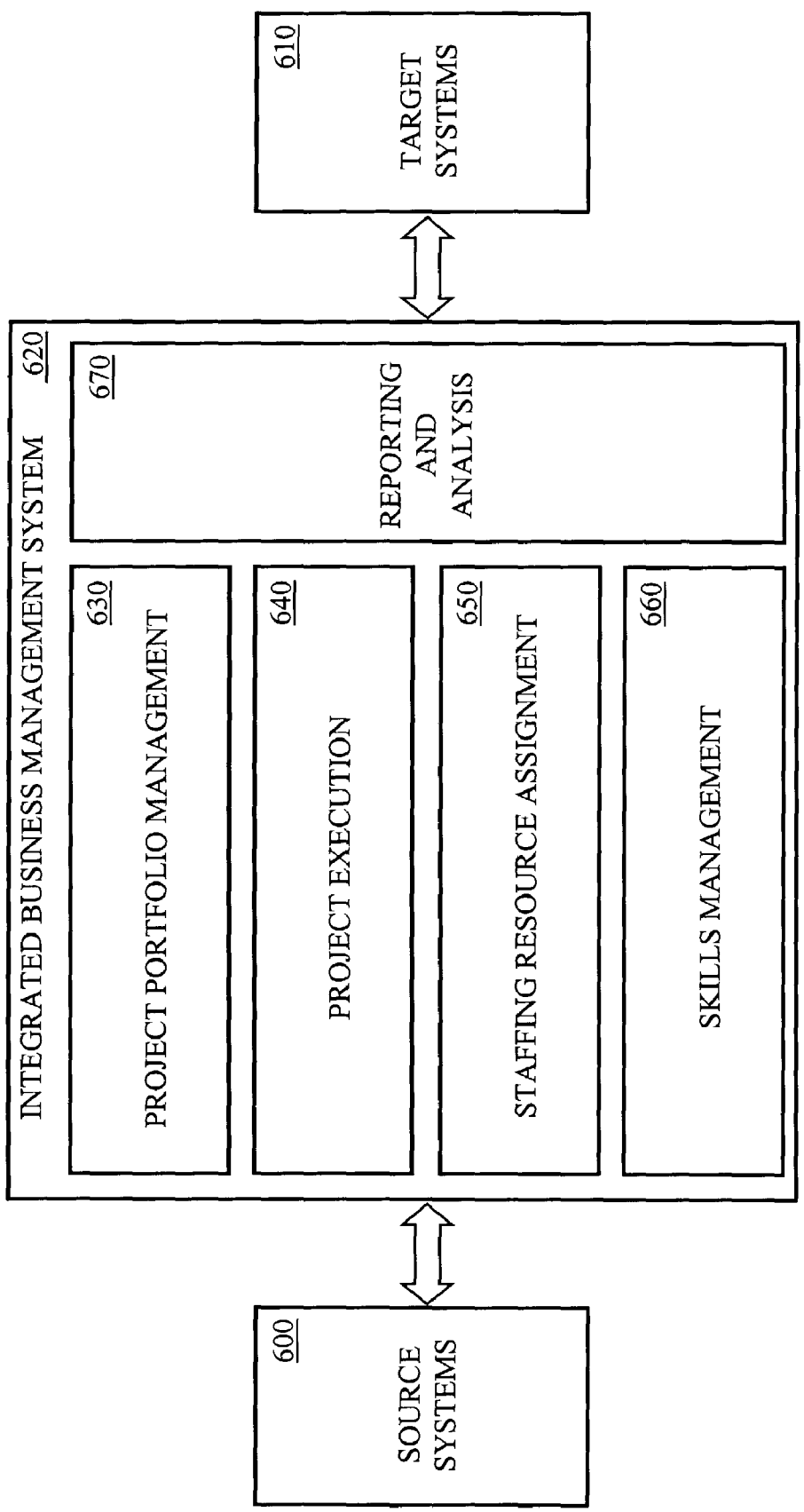
FIG. 6 is a block diagram illustrating functional components and interactions for an example integrated business management system.

FIG. 6 is a block diagram illustrating functional components and interactions for an example integrated business management system 620. The management system 620 communicates with source systems 600 as described above. The management system 620 includes four modules: a project portfolio management module 630 handles strategic level functions, a project execution module 640 handles operational level functions, a staffing resource assignment module 650 handles transactional level functions, and a skills management module 660 handles administrative level functions.

The portfolio management module 630 can generate portfolio views and a project dashboard. The project execution module 640 can be used to manage project data, tasks and team collaboration. The project execution module 640 can support project activities such as proposing projects, importing WBS task information, extending projects, approving projects, canceling projects, viewing team schedules and rosters, scheduling meetings and attending on-line team meetings, communicating with team members, sharing and collaboratively generating documents, adding task documents and task comments, updating task completion percentages, changing task status, assigning roles to tasks, creating and completing project assessments, and reporting on project execution.

The staffing resource assignment module 650 can be used to manage capacity, define and search for projects, search for and assign resources (e.g., funding, staffing) to projects, and report resource assignments. The skills management module 660 can be used to profile resources, including assisted, active and passive resource profiling. For example, the skills management module 660 can support publishing of skills and aspirations from profiles, generation and publication of knowledge terms, updating of a profile upon task and/or project completion, verification and approval of profile changes, and reporting of skills management activities.

The functionality described above can be provided through a reporting and analysis module 670 to target systems 610. The reporting and analysis module 670 can support powerful and intuitive graphical user interfaces as described below to integrate and consolidate data from multiple source systems 600. These graphical user interfaces can form part of the integrated business management system, creating an efficient interface for comprehensive high level business management activities. These activities can involve both portfolio analysis and management, including the following: (1) maximizing portfolio value by measuring expected commercial value (ECV) and net present value (NPV), including conducting NPV sensitivity analysis, of multiple business projects, (2) balancing portfolio risk and reward by plotting projects against probabilities of technical and commercial success, (3) aligning a portfolio with business objectives by determining spending allocation across project categories and business areas and understanding the distribution of intellectual capital across the enterprise, and (4) managing capacity of project resources to optimize resource allocation across multiple projects.

Figure 7:
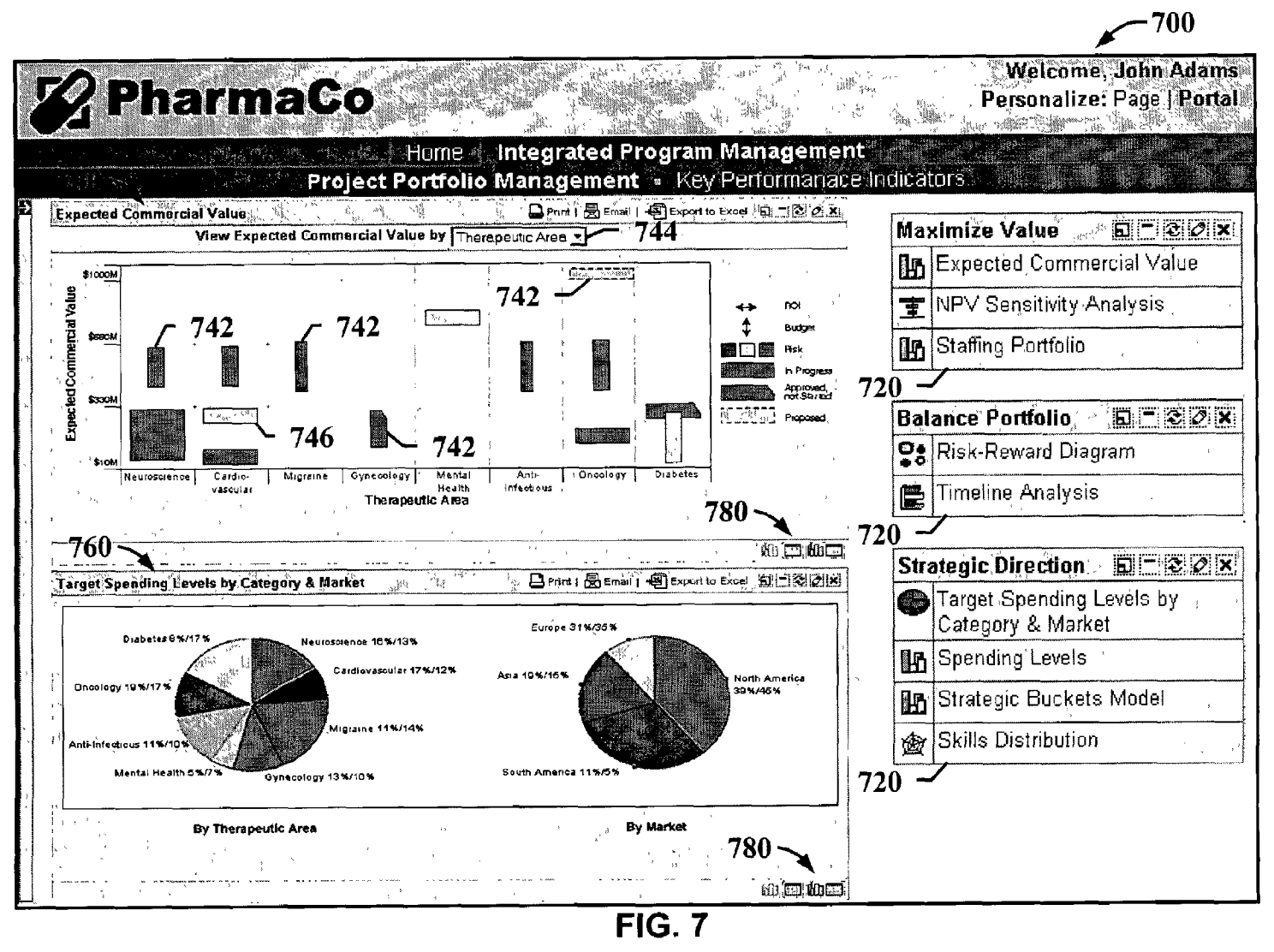

FIG. 7 shows an example view 700 created by an integrated program management system. The view 700 and the other view described below can be Web pages. These views also can be windows with associated function buttons (e.g., minimize, restore/maximize, and close buttons) and/or scroll bars. These views can be frames within windows or Web pages.

The view 700 shows a presentation that has been personalized through a portal for a user (e.g., John Adams) with an executive role, which is a composite role including multiple component roles. The view 700 presents a project portfolio management user interface that includes three chart selection views 720 that correspond to three general methods of portfolio management: portfolio value maximization, portfolio balancing, and strategic direction planning.

The chart selection views 720 allow a user to open as many different charts as desired in the view 700 and close open charts by clicking on the corresponding name (or the close icon in the chart view); the name is a link to the chart. The value maximization chart selection view can include links to an expected commercial value chart, an NPV sensitivity analysis chart, and a staffing portfolio chart. The portfolio balancing chart selection view can include links to a risk-reward diagram and a timeline analysis chart. The strategic direction planning chart selection view can include links to a target spending levels by category and market chart, a spending levels chart, a strategic buckets model chart, and a skill distribution chart.

The view 700 shows an example expected commercial value chart 740 and an example target spending levels by category and market chart 760. Both of these charts 740, 760 include a charting type toggle 780, which can be used to switch between the chart of the data, a tabular view of the data, and both together, by clicking a corresponding icon. Currently only the charts are shown, as indicated by the grayed out chart icons.

The expected commercial value chart 740 provides a comprehensive overview of all business projects by displaying these projects as graphic objects, such as graphic objects 742. These graphic objects model their respective projects and present multiple aspects of the projects at a single glance. A position of a graphic object in the X direction indicates a project category for the project, and a position in the Y direction indicates expected commercial value of the project.

The width of the graphic object indicates the return on investment (ROI), and the height of the graphic object indicates the budget of the corresponding project. The object interior (e.g., object color) of the graphic object indicates risk level, and the object boundary (e.g., object shape and/or object border) indicates project status. In this case, both the object boundary and the object interior are used to identify proposed projects.

The X dimension of the chart 740 can be changed by selecting alternatives from a drop down box 744. Changing the X dimension results in a corresponding repositioning of the graphic objects. The alternative X dimensions can include delivery date, project phase, budget, risk, and headcount. Changing the X dimension can also affect other aspects of the chart 740. For example, if the X dimension is changed to budget, the height of the graphic objects can be automatically changed to reflect headcount for the corresponding projects. Moreover, the Y dimension of the chart 740 also can be changed, such as to net present value.

Various elements of the charts 740, 760, and the other charts described below, can be made responsive to selection. For example, holding a cursor over chart elements, such as the graphic objects in the chart 740, can cause additional details to be displayed, such as a project name.

Additionally, clicking on chart elements can cause additional views to be opened. Such functionality can include clicking on an X dimension label in the chart 740 to open a view into additional details concerning the selected business area, and clicking on a graphic object 746 to open a view into additional details concerning the corresponding project. Thus, a user can drill down into additional details as desired. All of the charts and tables described herein can include multiple elements that are responsive to selection (e.g., a category axis in a skill distribution chart, such as in FIG. 13, can be responsive to selection).

Figure 8:
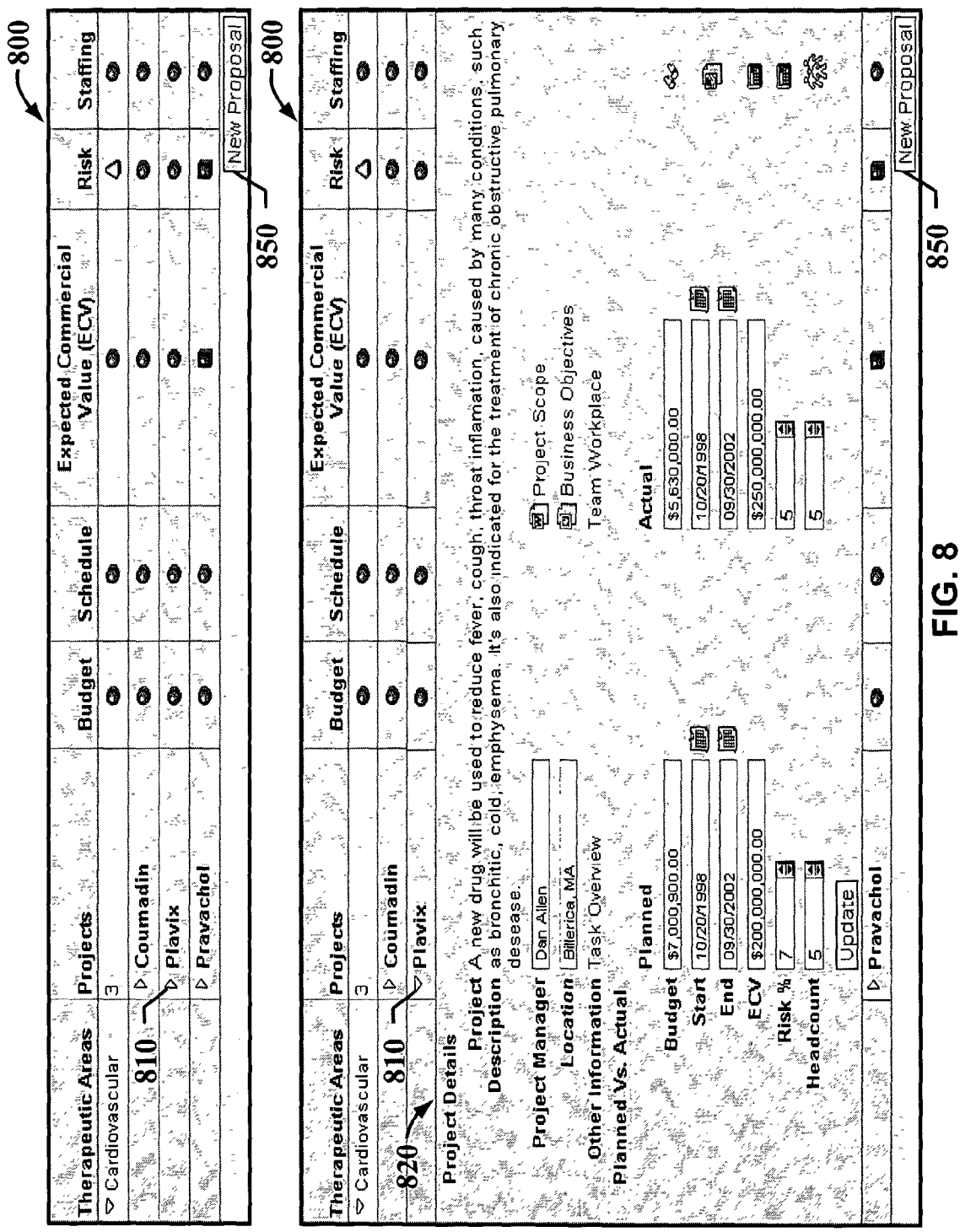
FIG. 8 shows an example view that is displayed when a business area is selected, such as by clicking on a business area label on a chart.

FIG. 8 shows an example view 800 that is displayed when a business area is selected, such as by clicking on a business area label on a chart. The view 800 presents all the projects that fall under a cardiovascular therapeutic area in the form of a mini-dashboard that summarizes budget, schedule, ECV, risk, and staffing status for the projects using color and shape coded icons (e.g., a green circle indicates the item is alright, a yellow triangle indicates a caution, and a red square indicates a critical issue). Additional details can be shown in the view 800 by clicking on a twisty icon, such as a twisty icon 810 to show project details 820 for a drug named Plavix®.

The additional details 820 include project description, project manager, and location information. The details 820 also include links to documents and other information and functions, as well as planned and actual data for the various project aspects described above. Moreover, the view 800 includes a new proposal link 850, which opens a new proposal view for use in defining new proposals.

FIG. 9 shows an example view 900 that is displayed when a project is selected, such as by clicking on a graphic object in an expected commercial value chart. The example project here is Plavix®. The view 900 includes information and links as in the view 800.

Figure 10:
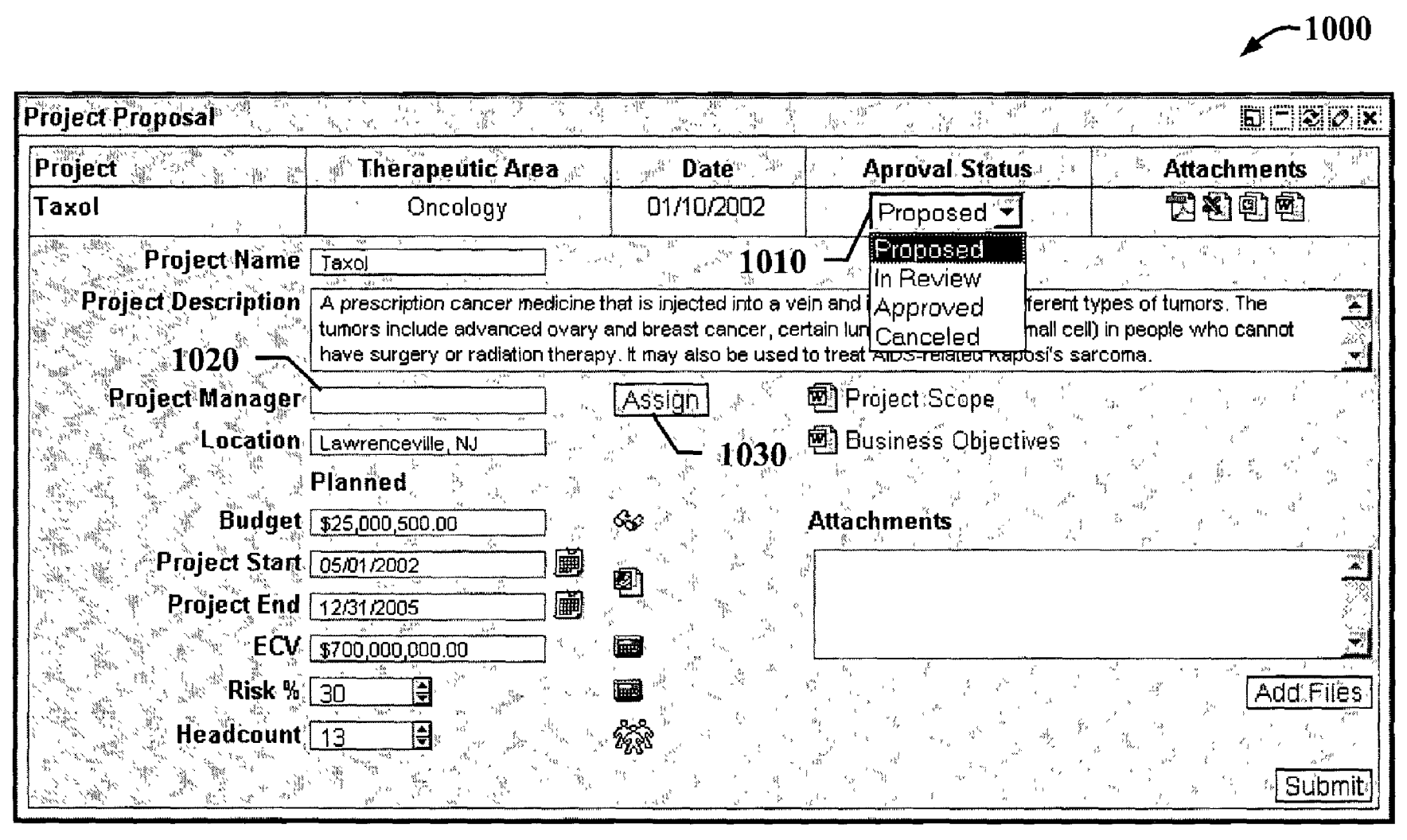

FIG. 10 shows an example view 1000 that is displayed when a proposed project is selected. The example proposed project here is a drug named Taxol®. The view 1000 includes information and links as before. Additionally, the view 1000 includes executive input interfaces. The view 1000 includes an approval status drop down box 1010, which an executive can use to change the status of the project. The view 1000 also includes a project manager field 1020 in which an executive can type the name of a potential manager for the project. For example, an executive may type in "Pat Lee" in the project manager field 1020 and click an assign link 1030, which can result in a person search result view being displayed.

Figure 11:
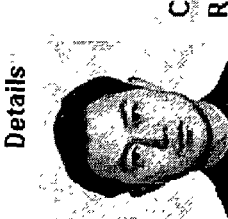
FIG. 11 shows an example person search result view and an example profile view.

FIG. 11 shows an example person search result view 1100 and an example profile view 1150. The person search result view 1100 shows all the names with an occurrence of "pat lee" in them. Details about a person are summarized with icons, charts or graphs and text, such as percentage summaries of date, skill set, location and cost, and details concerning approver, department and terms summarizing experience and qualifications.

As shown, the intersection of project requirements and individual capabilities can be summarized using pie chart icons 1110. Pat Lee has a skill set that fully covers the skills required for the project. In addition to the summary categories shown, other categories can be used, such as an aspirations category. The aspirations category can summarize a comparison of skills required by or useful for a project, and other aspects of a project (e.g., assigned project manager), with skills and project types aspired to by an individual. Thus, individuals can be matched with projects base on the individuals' preferences and/or qualifications, as well as actually acquired skills sets.

The view 1100 can include elements that are responsive to selection, such as links to other views. Clicking on a person's name (e.g., Pat Lee) opens up a profile view for that person. The profile view 1150 shows details about Pat Lee. The profile view 1150 can include multiple tabs to additional information, such as skills and aspirations & assessments. A skills tab 1160 can be used to display the person's experience and qualifications and details of skills held by the person, including relevant degrees, and a summary of current level and aspired level in the skills held. Examples skills include problem-solving, communication skills, ionization techniques/MS, liquid chromatography/MS, tandem mass spectrometry, ion trap instrumentation, NMR spectroscopy, separations science, physical chemistry, and supervisory skills. Example skill levels include none, basic, proficient, advanced, and expert.

An aspirations & assessment tab 1170 can be used to display additional details about the profile. Such details can include professional career information, acquired industry know-how information, location information, a list of managers the person would like to work for and an order of preference, and summaries of assessments, certifications, awards, patents, and publications.

Figure 12:
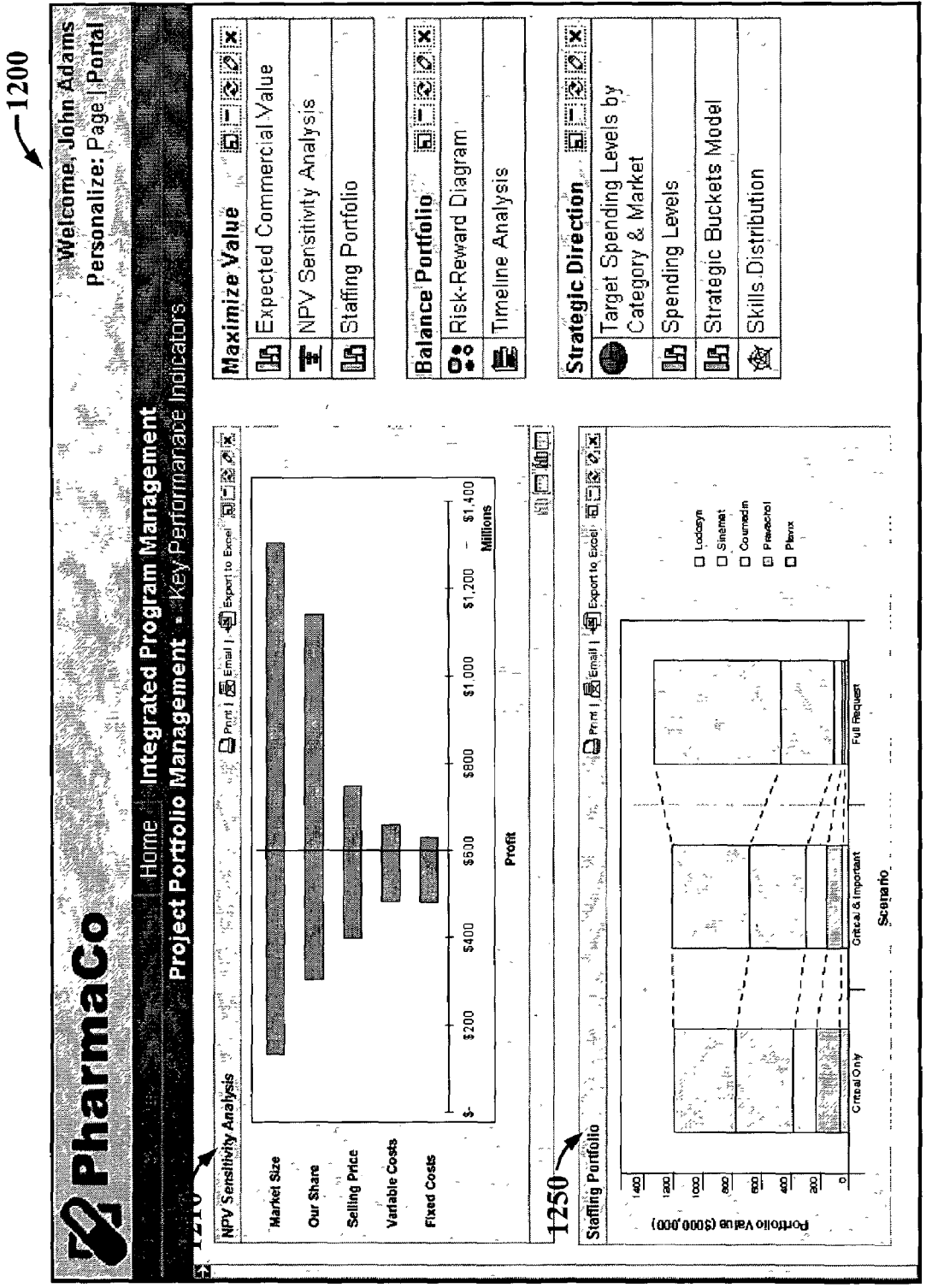
FIG. 12 shows an example view created by an integrated program management system.

FIG. 12 shows an example view 1200 created by an integrated program management system. The view 1200 is similar to the view 700 in FIG. 7. The view 1200 shows an example NPV sensitivity analysis chart 1210 and an example staffing portfolio chart 1250.

Figure 13:
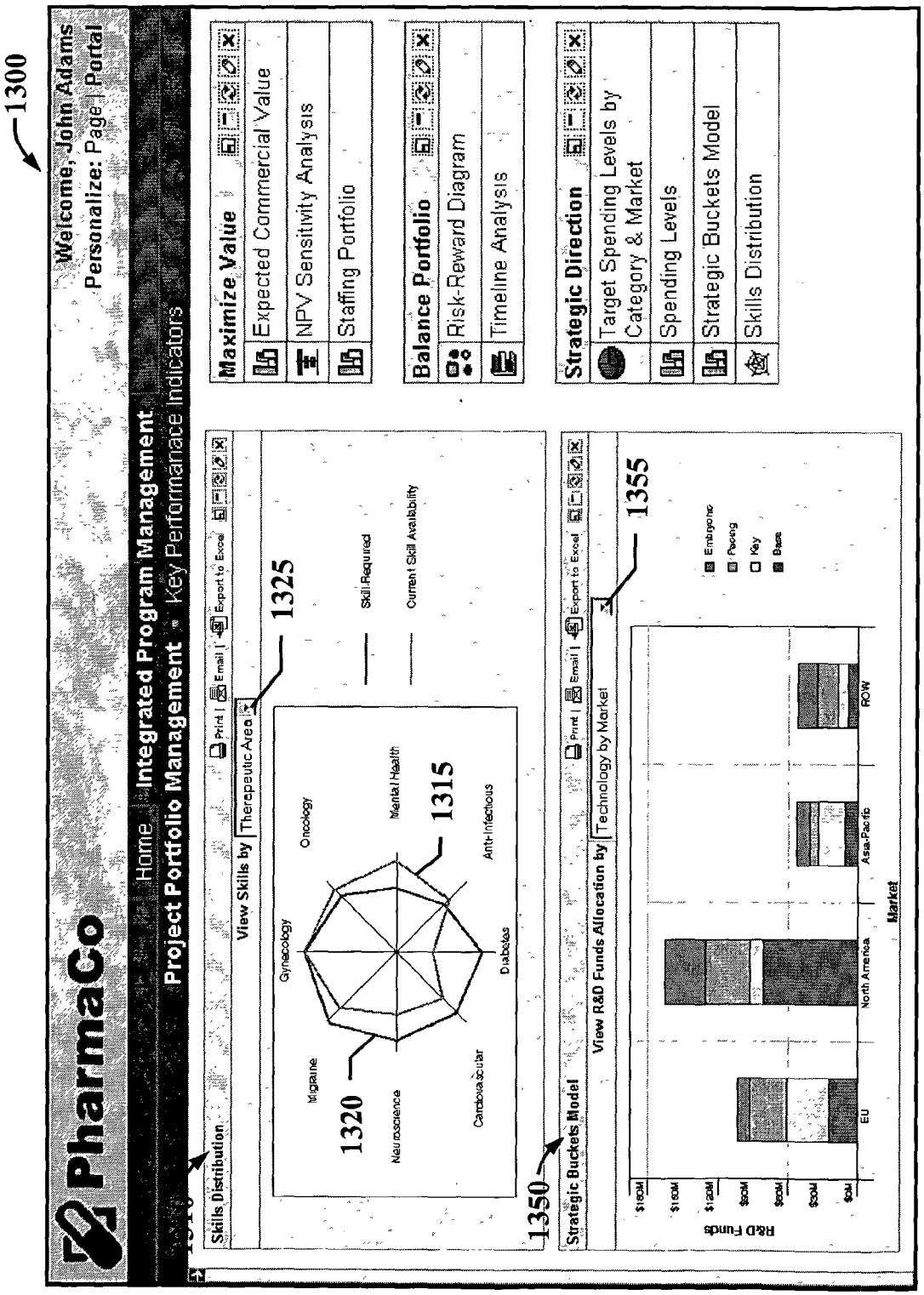
FIG. 13 shows another example view created by an integrated program management system.

FIG. 13 shows an example view 1300 created by an integrated program management system. The view 1300 shows an example skill distribution chart 1310 and an example strategic buckets model chart 1350. The skill distribution chart 1310 displays skill availability information as a geometric object 1315 on eight axes. The skill distribution chart 1310 also displays skill needs information as a geometric object 1320 on the eight axes. Overlap of the geometric object 1315, 1320 indicates relationships between the skill availability information and the skill needs information (e.g., a spider chart presentation of skill needs and availability).

An axis in the skill distribution chart 1310 is a reference line along which distance is measured, where the distance corresponds to a measure of skill in a category in which levels and amount of skill(s) are defined. The categories, and thus the number of axes also, can be changed by selecting another category class from a drop down box 1325. In the example shown, the eight axes correspond to eight therapeutic areas from a business-area category class. Other example category classes include highest demand skills and business location.

The strategic buckets model chart 1350 shows research and development (R&D) funds allocation by technology by market location (e.g., European Union, North America, Asia-Pacific, and ROW (rest of the world)). Other chart formats can be selected using a drop down box 1355. Example alternative chart formats include R&D funds allocation by technology by business area (e.g., therapeutic area), R&D funds allocation by market location by technology, and R&D funds allocation by business area by technology.

Figure 14:
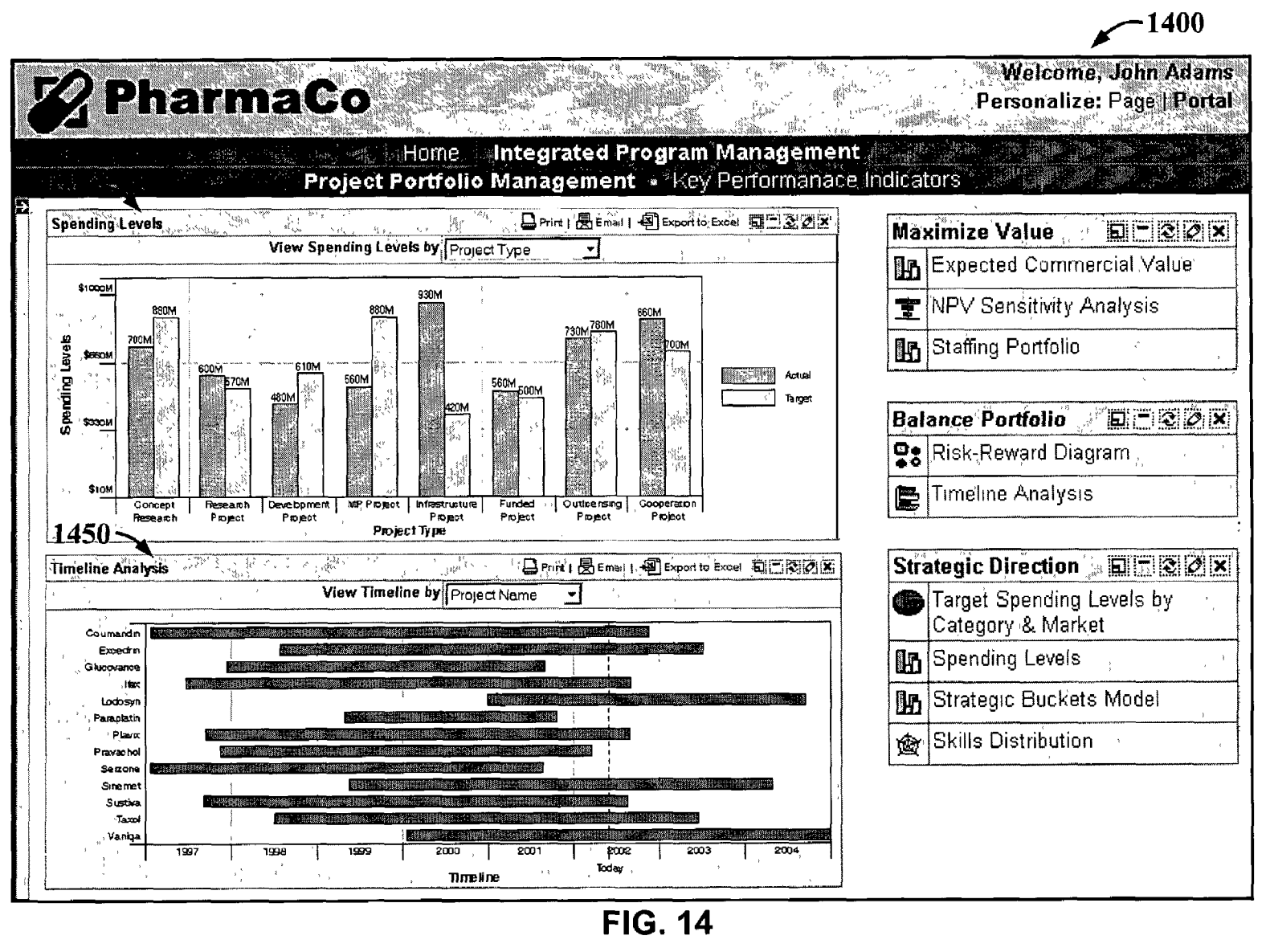

FIG. 14 shows an example view 1400 created by an integrated program management system. The view 1400 shows an example spending levels chart 1410 and an example timeline analysis chart 1450. The spending levels chart 1410 can be presented using multiple chart formats selected by a drop down box. Example spending chart formats include spending levels by project type, location, and development phase. The timeline analysis chart 1450 also can be presented using multiple chart formats selected by a drop down box. Example timeline chart formats include timeline by project name, project type, and business area.

Figure 15:
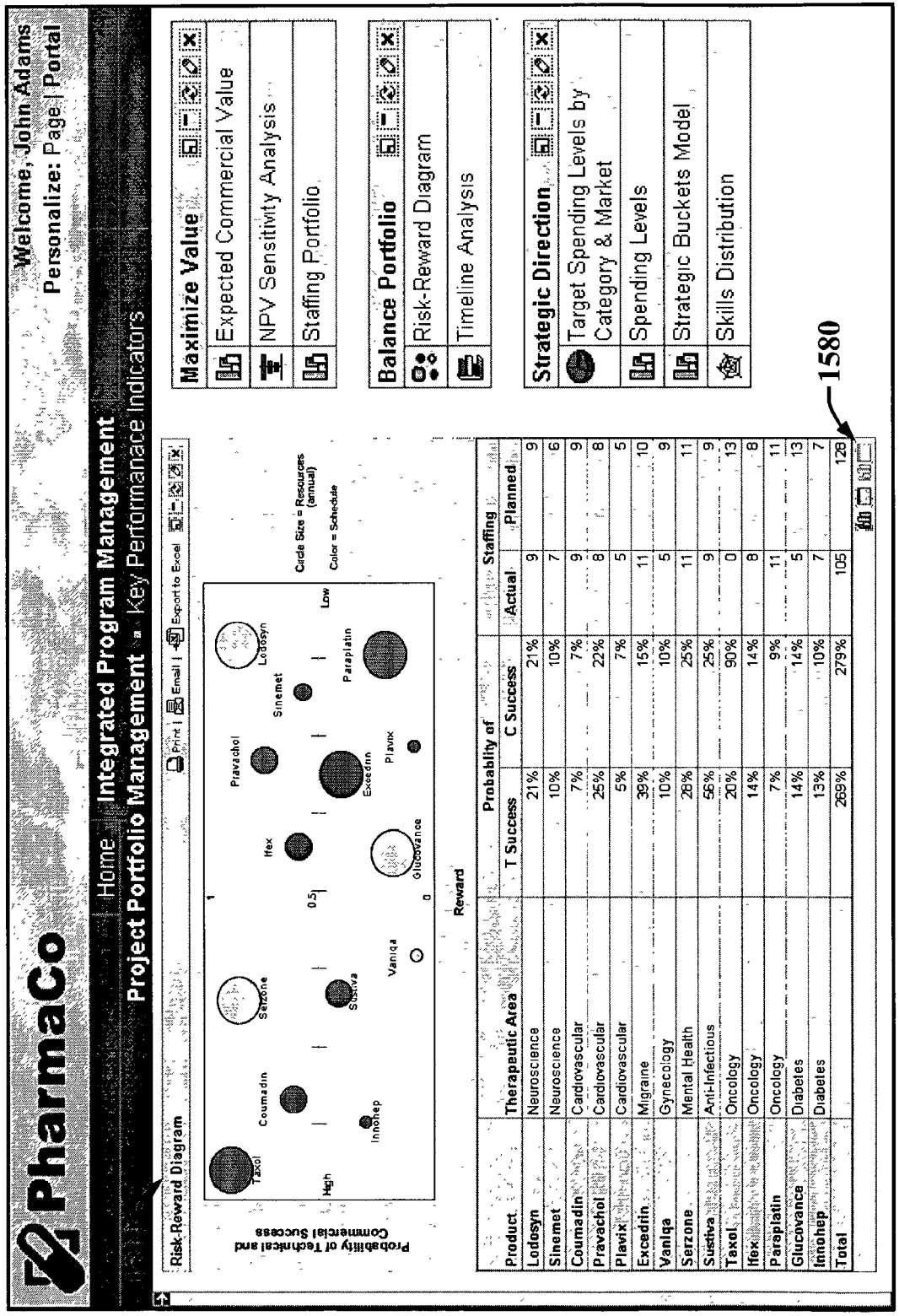
FIG. 15 shows another example view created by an integrated program management system.

FIG. 15 shows an example view 1500 created by an integrated program management system. The view 1500 shows an example risk-reward diagram 1510. The risk-reward diagram 1510 includes both a chart and a tabular view of the data because a charting type toggle 1580 has been set to view both chart and table together.

The risk-reward chart displays projects as graphic objects. These graphic objects model their respective projects and present multiple aspects of the projects. A position of a graphic object in the X direction indicates potential reward for the project, and a position in the Y direction indicates probability of technical and commercial success. The object size indicates annual resources for the project (e.g., project budget). The object interior (e.g., object color) indicates project schedule information.

FIG. 16 shows an example view 1600 created by an integrated program management system. The view 1600 presents a key performance indicators user interface that includes a project dashboard 1610 and an alerts and notifications view 1650. The project dashboard 1610 functions in the same manner as the view 800 described above. Additionally, the project dashboard 1610 includes a phase field 1615 to indicate phase of development of particular projects.

In addition to the presentations personalized for an executive role described above, other personalized presentations are possible for other roles. For example, users having a project leader role or a resource manager role can be provided an alternative integrated program management presentation through the portal. This alternative presentation can include tabs for a project dashboard view, a resource management view, a task management view, and a project staffing view.

The project dashboard view can be as described above in connection with FIGS. 8 and 16. The resource management view can present an alerts & notifications view and a capacity planning view. The task management view can present an interface for tracking and updating all tasks. This interface can break down the tasks by project and/or status and can display details regarding task assignments, status, percent complete, and planned and actual starting and ending dates. The project staffing view can present an interface for adding roles and assigning staff to projects.

Figure 17:
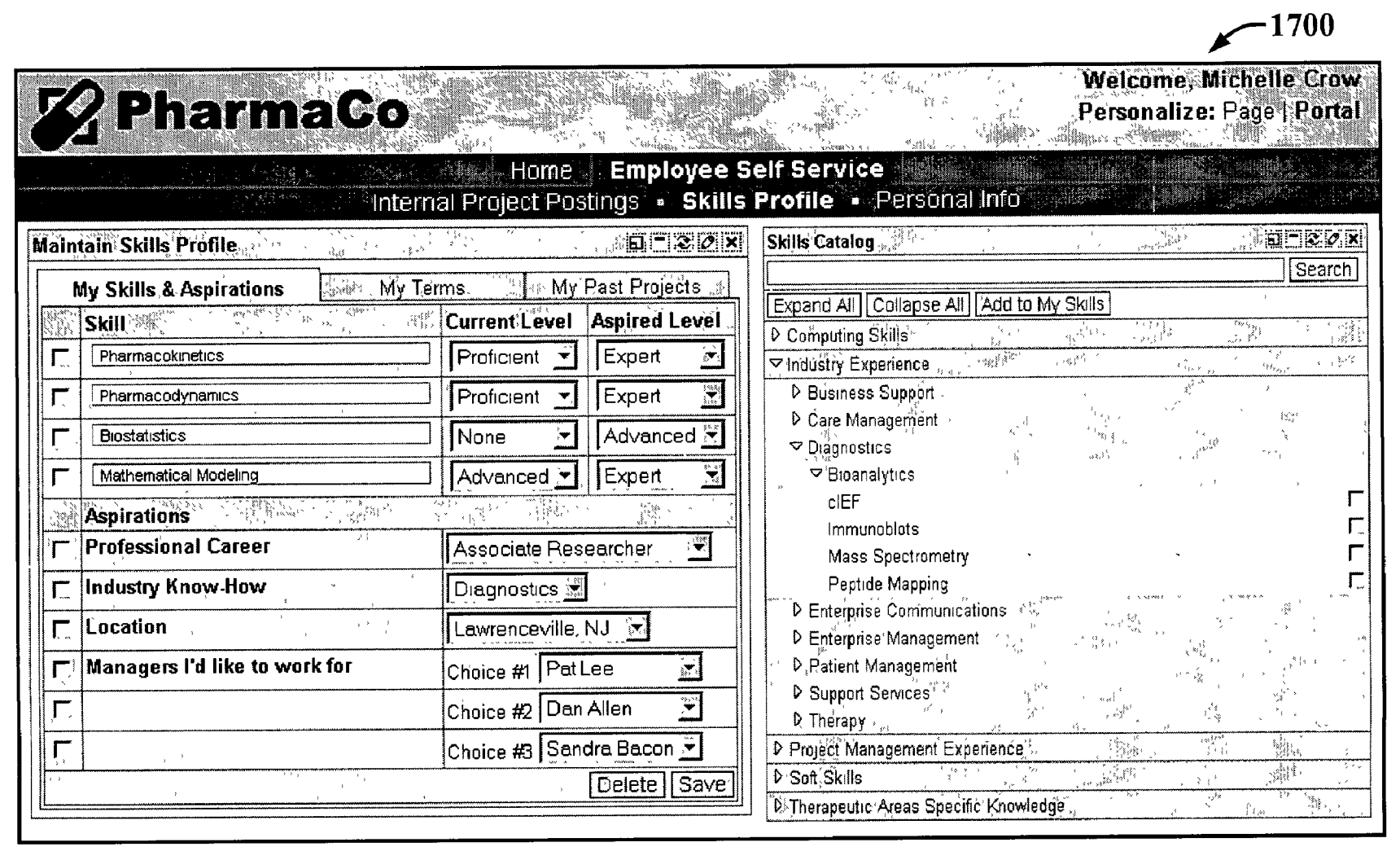

FIG. 17 shows an example view 1700 that has been personalized through a portal for a user with an employee role. The view 1700 includes an employee self service tab, which has additional sub-tabs for an internal project postings view, a skills profile view, and a personal information view. The view shown is the skills profile view where the employee can maintain her skills profile, including both current skills and aspirations, and search a skills catalogue to update her profile with new skills.

The internal project postings view can allow the employee to search for project roles and to browse project roles by project and/or business area. A project role can be clicked on to view details of the role. The personal information view can allow the employee to track and update additional profile information that does not become part of the public profile accessible by others. Thus, an employee can securely review her knowledge and skill terms and decide which terms to make public and thus searchable.

Figure 18:
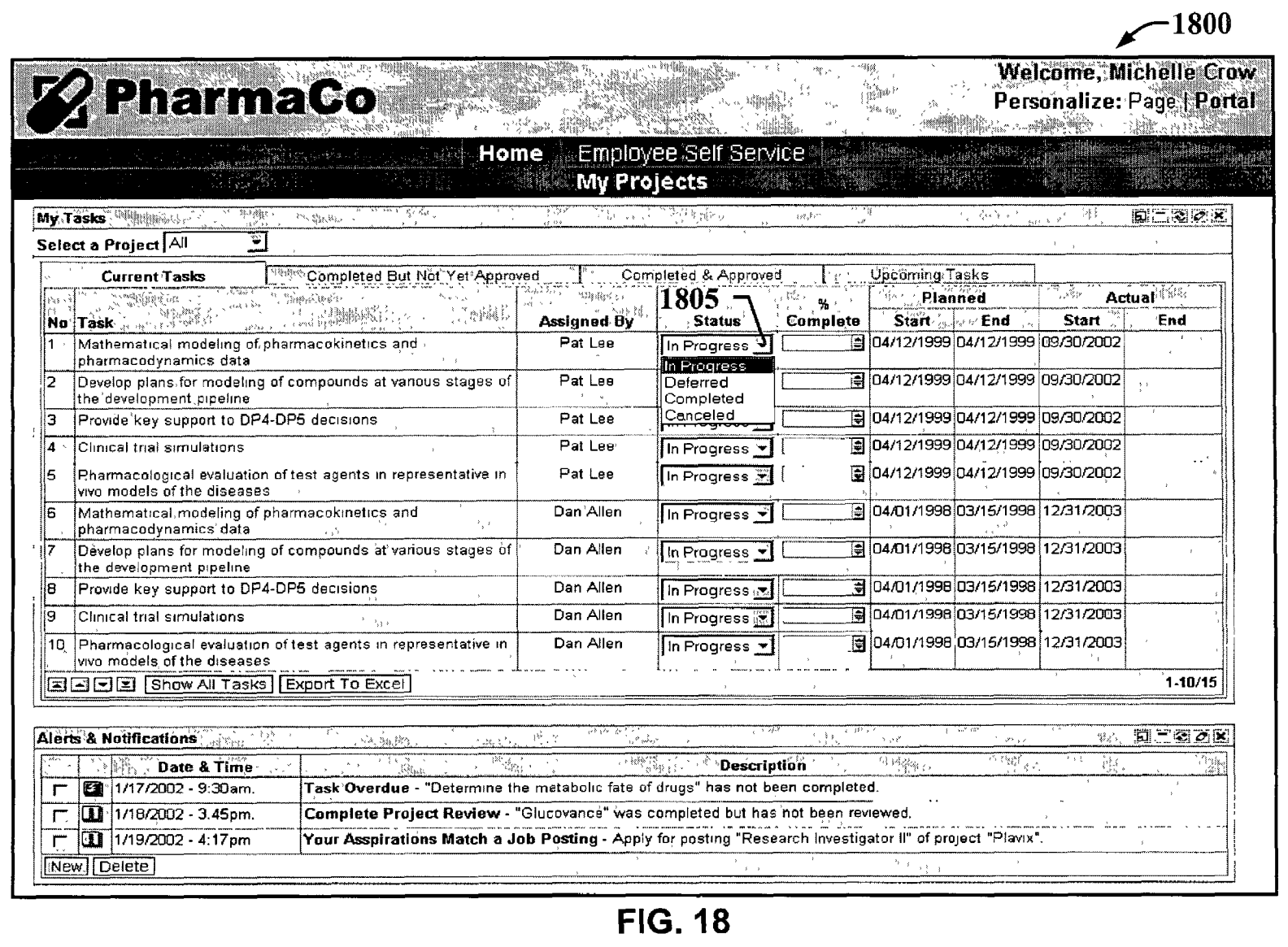

FIG. 18 shows an example employee projects view 1800. The projects view 1800 can present an alerts & notifications view and a task management view. The task management view can present an interface for tracking and updating all tasks for the employee. As before, this interface can break down tasks by project and/or status and can display details regarding task assignments, status, percent complete, and planned and actual starting and ending dates.

Status for a task can be changed, such as selecting a new status (e.g., in progress, deferred, completed, cancelled) from a drop down box 1805. When the status of a task is changed, such as from in progress to completed, an assisted profiling view can automatically pop up. An assisted profiling view asks the employee to update her skills and can suggest possible skills to update based on the task completed.

A task has an associated set of skills that can be required skills or skills considered useful for the project (skill needs information). When the status of a task is changed, this skill needs information associated with the task, and the individual's role in connection with the task, can be used to generate suggestions of possible skills to update. This can include improved skill levels for existing skills and acquisition of new skills. Thus, an individual's skill profile can be kept up to date with the completion of each task, and the individual's skill profile can actively reflect experience and knowledge gained from actual project work.

Figure 19:
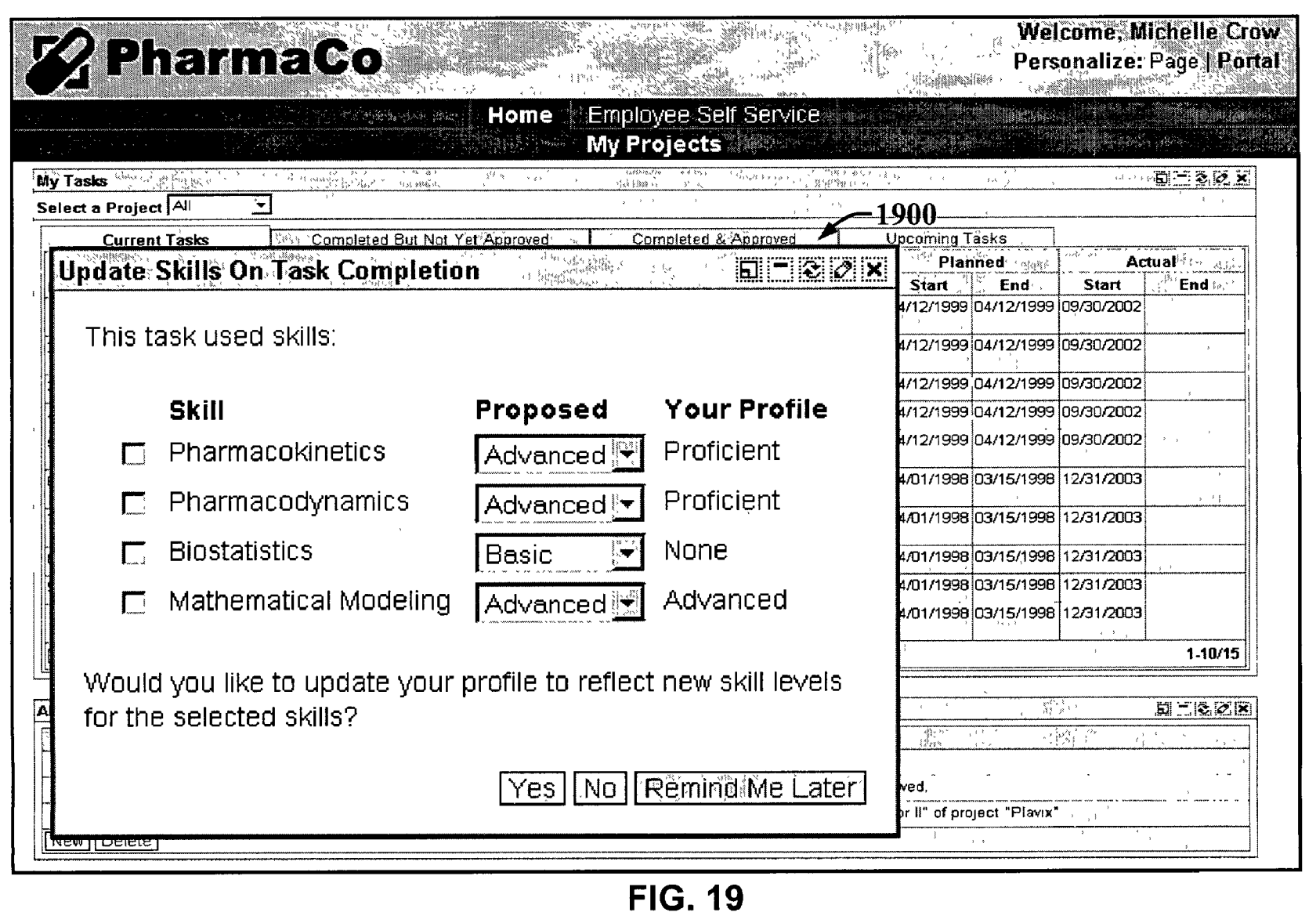

FIG. 19 shows an example assisted profiling view 1900. The assisted profiling view 1900 suggests possible skills to update and allows skills and a corresponding skill level to be selected (e.g., with check boxes and drop down boxes). The system can automatically send a notification message to the employee's manager asking to verify and approve the skills update.

Changing the status of the last task in a project to completed can cause a project review questionnaire to automatically be presented. FIG. 20 shows an example project review questionnaire 2000. The employee can then fill out the questionnaire to rate the employee's performance, a manager's performance, and project results.

The specific implementations described above have been presented by way of example only. The logic flow depicted and described in connection with FIG. 1 does not require the particular order shown, or sequential order, to achieve desirable results. In certain implementations, multitasking and parallel processing may be preferable. Although only a few embodiments have been described in detail above, other modifications are possible. Other embodiments are within the scope of the following claims.

What is claimed is:

1. A method comprising:
  receiving status information relating to a project in a project management system; and
  in response to receiving the status information, presenting an assisted profiling interface to obtain updates to a skills profile, the assisted profiling interface providing suggested updates based on the skills profile and a role associated with the project.

2. The method of claim 1, wherein receiving the status information comprises receiving an indication of a completed status for a task included in the project, the role being further associated with the task.

3. The method of claim 2, wherein presenting the assisted profiling interface comprises displaying the suggested updates based on skill needs information associated with the task and based on the skills profile associated with a user associated with the role.

4. The method of claim 3, wherein displaying the suggested updates comprises displaying task skills associated with the task, current skill proficiency levels from the skills profile for the task skills, and suggested new proficiency levels for the task skills, the suggested new proficiency levels derived from the task and the current skill proficiency levels.

5. The method of claim 1, further comprising:
  receiving the updates; and
  in response to receiving the updates, obtaining approval for the updates before finalizing the updates in the skills profile.

6. The method of claim 1, wherein receiving the status information comprises receiving an indication of a completed status for the project, and wherein presenting the assisted profiling interface comprises presenting personalized assisted profiling interfaces to obtain updates to skills profiles for multiple users associated with the project, the personalized assisted profiling interfaces providing suggested updates based on the skills profiles and roles for the users.

7. A method comprising:
receiving information indicating a status of completion for a task in a project in a project management system; and
in response to receiving the information, presenting a graphical user interface to obtain updates to a skills profile, the graphical user interface listing task skills associated with the task, current skill proficiency levels for the task skills for a user associated with the skills profile, and suggested new proficiency levels for the task skills, the suggested new proficiency levels derived from the task and the current skill proficiency levels, wherein the graphical user interface includes user interface elements associated with the suggested new proficiency levels to receive alternative new proficiency levels.

8. The method of claim 7, further comprising:
receiving the updates;
providing a manager interface to obtain approval of the received updates, the manager interface including an option to respond with feedback;
receiving the approval; and
in response to receiving the approval, finalizing the updates in the skills profile.

9. The method of claim 7, wherein the user interface elements comprise drop down boxes.

10. An article comprising a machine-readable medium storing instructions operable to cause one or more machines to perform operations comprising:
receiving status information relating to a project in a project management system; and
in response to receiving the status information, presenting an assisted profiling interface to obtain updates to a skills profile, the assisted profiling interface providing suggested updates based on the skills profile and a role associated with the project.

11. The article of claim 10, wherein receiving the status information comprises receiving an indication of a completed status for a task included in the project, the role being further associated with the task.

12. The article of claim 11, wherein presenting the assisted profiling interface comprises displaying the suggested updates based on skill needs information associated with the task and based on the skills profile associated with a user associated with the role.

13. The article of claim 12, wherein displaying the suggested updates comprises displaying task skills associated with the task, current skill proficiency levels from the skills profile for the task skills, and suggested new proficiency levels for the task skills, the suggested new proficiency levels derived from the task and the current skill proficiency levels.

14. The article of claim 10, wherein the operations further comprise:
receiving the updates; and
in response to receiving the updates, obtaining approval for the updates before finalizing the updates in the skills profile.

15. An article comprising a machine-readable medium storing instructions operable to cause one or more machines to perform operations comprising:
receiving information indicating a status of completion for a task in a project in a project management system; and
in response to receiving the information, presenting a graphical user interface to obtain updates to a skills profile, the graphical user interface listing task skills associated with the task, current skill proficiency levels for the task skills for a user associated with the skills profile, and suggested new proficiency levels for the task skills, the suggested new proficiency levels derived from the task and the current skill proficiency levels, wherein the graphical user interface includes user interface elements associated with the suggested new proficiency levels to receive alternative new proficiency levels.

16. The article of claim 15, wherein the operations further comprise:
receiving the updates;
providing a manager interface to obtain approval of the received updates, the manager interface including an option to respond with feedback;
receiving the approval; and
in response to receiving the approval, finalizing the updates in the skills profile.

17. The article of claim 15, wherein the user interface elements comprise drop down boxes.

18. An apparatus comprising:
means for receiving status information relating to a project in a project management system; and
means for presenting an assisted profiling interface to obtain updates to a skills profile, the assisted profiling interface providing suggested updates based on the skills profile and a role associated with the project.

19. The apparatus of claim 18, wherein the means for receiving comprises means for receiving an indication of a completed status for a task included in the project, the role being further associated with the task.

20. The apparatus of claim 19, wherein the means for presenting comprises graphical means for presenting the suggested updates based on skill needs information associated with the task and based on the skills profile associated with a user associated with the role.

* * * * *